Aug. 27, 1946.   J. D. GERAHTY   2,406,678
CONTAINER AND METHOD OF MAKING SAME
Filed March 8, 1943
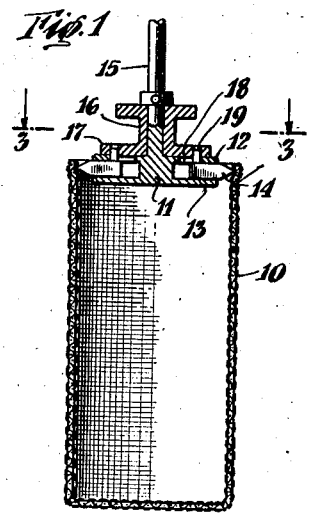
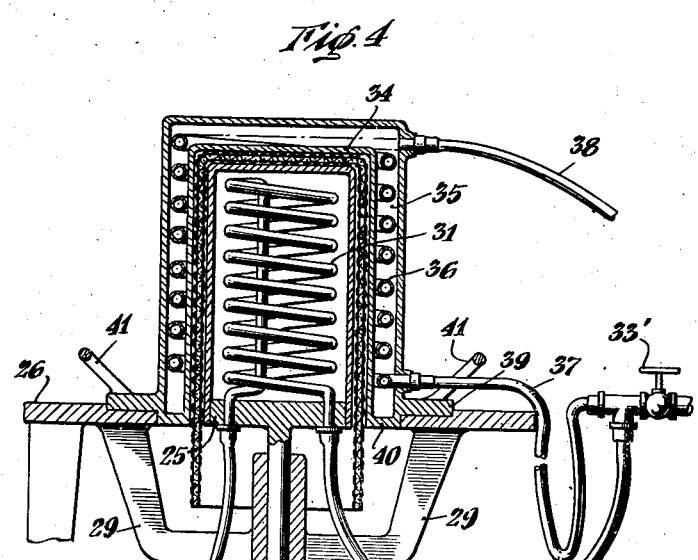
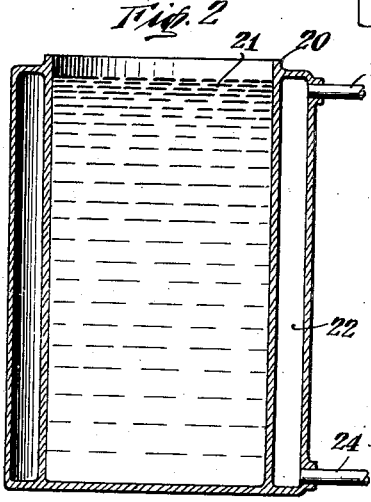
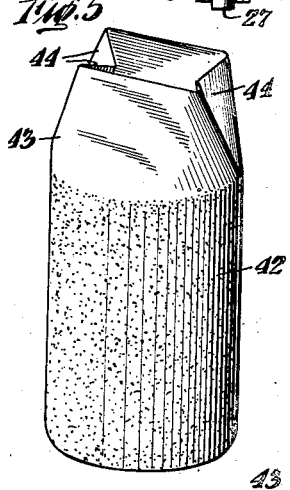
INVENTOR.
BY James D. Gerahty
Townsend+Decker
ATTORNEYS Patented Aug. 27, 1946

2,406,678

UNITED STATES PATENT OFFICE 2,406,678

CONTAINER AND METHOD OF MAKING SAME

James D. Gerahty, New York, N. Y.

Application March 8, 1943, Serial No. 478,386

9 Claims. (Cl. 18—47.5)

This invention relates to containers generally and has for its principal object the production of a container adapted to be expeditiously and economically manufactured and to be employed as a substitute for or to supersede those now well-known and constituted of metal, fiber, paper, glass or other materials and adapted for packaging, carrying, storing or dispensing a variety of articles.

Briefly stated, the invention consists in and has for its objects the provision of a cylindrically formed or other shaped fibered foundation or reinforcement having an open mouth and closed at its bottom and then impregnating and/or coating said foundation with a suitable resin and subjecting the foundation so treated to heat of a sufficient degree to harden and/or polymerize the resin and produce a container having lightness in weight, strength, and rigidity while at the same time being resistant to fracture or breakage. The container constructed according to the invention also will be found to be leakproof, air-tight, impervious to moisture and resistant to the formation of bacterial growth.

In the construction of the container of the invention it is preferred to employ as the fibered foundation, a fabric, either woven, knitted, felted matted or "picked" in any well-known manner, from fibers, either mineral, organic, vegetable or synthetic. The fibered foundation, for instance, may be of cotton, wool, worsted, ramie, jute, kapok, linen, natural silk, rayon, viscose casein, cupro ammonia synthetic fibers ethyl cellulose, methyl cellulose, aceto butyrate cellulose, propionate derivatives of cellulose, or any other material equivalent to those mentioned and having similar characteristics.

Any number of a long list of resins suitable for the impregnation and coating of the fibered foundation may be employed and it is thought to be unnecessary to catalogue them. A phenolic liquid resin, however, without limiting the invention to its use, will be found to be an ideal one for the purpose, such phenolic resin being the product of a reaction of phenol and any suitable aldehyde. In many cases, also, the use of melamine as the resin will be found to be very desirable. The impregnation and/or coating of the fibered foundation or fabric may be effected conveniently by a variety of suitable mechanical instrumentalities as by dipping, soaking, spraying, pressing or forcing the resin through or into and on the foundation or fabric.

Other and further objects and advantages of the invention will become apparent as the description thereof proceeds, the invention consisting in the novel container and article of manufacture and the method of producing the same hereinafter more particularly described and then specified in the claims.

In the accompanying drawing illustrating a practical embodiment of the invention:

Fig. 1 is a section taken through a cylindrically shaped fabric or fibered bag forming the foundation or reinforcement of the container showing it held suspended by a suitable holder prior to dipping or immersion in the liquid resin.

Fig. 2 is a section taken through the liquid resin tank.

Fig. 3 is a horizontal cross-section on the line 3—3 of Fig. 1.

Fig. 4 is a section taken through a mold which may be employed for heat treating the foundation after its impregnation with the resin.

Fig. 5 is a perspective view of the container showing its untreated end folded to proper position for hermetically sealing the container.

Fig. 6 is a front elevation (partly in section) showing the sealing operation.

Fig. 7 is a perspective view of the completed container.

Referring in detail to the several figures of the drawing:

A cylindrically-formed or other geometrically-formed fibered bag-like foundation or reinforcement closed at its lower end and having an open mouth, as illustrated, is indicated at 10. This foundation is of the same configuration and of substantially the same diameter as the completed container. Other configurations, obviously, may be employed, depending on the nature of the finished product. For the purposes of holding said bag for purposes of impregnation in a liquid resin, a suitable holder has been provided comprising a body 11 having upper and lower plates 12 and 13 respectively supporting therebetween a plurality of radially directed, pointed and movable holding elements 14 adapted to engage against the inner side of the fibered foundation and hold the mouth thereof in disputed position as shown in Fig. 3. The body 11 carries a shaft 15 extending upwardly therefrom and said shaft carries an actuator 16 having a lower flange or plate 17 rotatably engaging the upper plate 12 and provided with radial slots 18 therein receiving pins 19 mounted on the holding elements 14. Obviously, rotation of the actuator 16 in the proper direction will reciprocate the holding elements inwardly or outwardly as the case may be because of the pin and slot connections between the parts just described.

After the fabric foundation 10 is supported by the holder 11 with the mouth of the foundation distended as shown in Fig. 3 the foundation is lowered into a tank 20 containing heated liquid resin 21, said tank being provided with a steam jacket 22 to which inlet and outlet steam pipes 23 and 24 are provided to permit the resin to be heated and retained in heated condition. The fabric foundation thereupon becomes thoroughly impregnated with the resin which not only enters the interstices of the fabric to close them but provides a coating of minimum thickness on either side of the foundation.

After impregnation, the fibered foundation is slipped over the hollow male member 25 of a molding machine with which it closely interfits. Said male member extends upwardly through a suitable opening in a table 26 and is supported by a shaft 27 slidably received by a bearing 28 which is fastened to the arms 29 of a spider which is fastened to and depends downwardly from the table 26. This permits adjustment of the vertical position of said male mold member 25 and it may be held in any desired position of adjustment by means of a set screw 30. Said hollow male member 25 is provided therein with a steam coil 31 for heating purposes said coil being connected by an inlet pipe 32 with a source of steam supply and being also provided with an outlet pipe 33. Admission of steam to the coil may be controlled by a valve 33'.

The hollow female member of the molding machine is indicated at 34. It is provided with a chamber or jacket 35 for receiving a steam coil 36 connected by an inlet pipe 37 with the same source of steam supply and also connected with an outlet pipe 38. Said female mold member is flanged as at 39, said flange being of a size permitting it to interfit with a shouldered portion on the table 26 as illustrated. The lower end 40 of said female mold member also extends within the opening which receives the male member and interfits with the wall of said opening so as to insure a close and firm but removable engagement between the parts. If so desired the flange 39 of the female member may be provided with suitable handles 41 for purposes of removal and placement.

After the impregnated and coated fabric or foundation has been slipped over the male mold member 25 of the molding machine, the female mold member 24 is supported in proper position on the table 26 as shown in Fig. 4 with the female member receiving the male member and the treated fibered foundation being interposed between both members and in close relationship thereto. When in that position, it will be noted that a certain portion of the fibered foundation is unsupported and extends freely downwardly from the table 26 so that it will be unaffected by the hardening and/or polymerizing operation. That operation may be effected by admitting steam to both coils to subject both mold members to sufficient heat to harden and/or polymerize the resin with which the fibered foundation is impregnated and coated. This produces a strong and rigid structure. Obviously, in some cases, it may be found unnecessary to heat both mold members, the heating of one only being sufficient to produce the desired results. Also, the employment of other heating means may be found desirable in some cases as, for instance, electric heating devices of various characters. It will also be understood that it is within the scope of the invention to effect the hardening and/or polymerization of the resin chemically by the utilization of catalysts of various types and with or without the employment of heat. After the hardening and polymerizing operation has been effected, a cylindrical container as shown in Fig. 5 is produced having a hardened main body portion indicated at 42 and an upper end 43 integral with the body but which has not been subjected to the hardening action so that it remains pliable and flexible.

For the purposes of closing and hermetically sealing the container, diametrically opposed portions of the pliable and flexible upper end 43 are creased or folded inwardly to form triangular portions 44 the apices of which lie in alignment and adjacent to each other. Such creased and folded upper end is folded over on itself as shown in Fig. 6 and is held firmly and tightly between the heated jaws of a clamp which are indicated diagrammatically at 45 in said figure. Said jaws are subjected to pressure and intense heat with the result that the upper folded end of the pliable and flexible portion 43 itself is hardened and/or polymerized to effect a hermetically sealed closure for the container constituting a portion of the container per se. After the container is sealed in the manner explained the upper pliable and flexible portion 43 carrying the sealed end with it may be pressed downwardly as shown in Figure 7. To open the container the upper portion 43 thereof is again pulled upwardly into the position shown in Fig. 6 and a knife may then be used to cut through said flexible portion 43, the upper edge of the hardened and polymerized portion 42 acting as a convenient guide for the knife for accomplishing that purpose.

While heretofore it has been proposed to mold a container or similar device from polymerized resin, these devices have not proven to be entirely satisfactory because of their brittleness and consequent susceptibility to breakage and for the further reason that the employment of a relatively large amount of resin is necessary to provide a wall of sufficient thickness to enable them to properly perform the function for which they are intended and which obviously, adds to their weight materially, of necessity. These disadvantages have been overcome by means of the present invention as the employment of a fabric or other fibered foundation or reinforcement in the structure not only acts as a strengthening member therefor but permits the utilization of a relatively small amount of resin in the manufacture of the device thus making for economy and permitting a very rapid curing or hardening of the resin. The container of the invention, furthermore, is not only materially stronger than the old type molded entirely of polymerized resin but it is also shock resistant and resistant to fracture or breakage which characteristics are not possessed by the old type just referred to.

It will be understood that the invention is not limited in its application to containers per se but various other devices having a number of different uses may be constructed in accordance therewith and these devices may have a plurality of different and varying configurations. It will be further understood that instead of hermetically sealing the end of the container in the manner described, it will be found desirable in some cases to harden and/or polymerize the impregnated and coated foundation or reinforcement throughout its length and to employ a separate closure or cover for the body itself, constructed in the same manner as the body, and which shall be adapted to snugly and frictionally interfit with said body and, if so desired, to be attached thereto in any desirable manner. Containers of this type will be found useful for packaging and shipping a wide variety of commodities.

The invention claimed is:

1. The method of manufacturing a container consisting in providing a flexible bag-like fibered foundation closed at one end and having an open mouth, impregnating and coating both surfaces of said foundation with a thin coating of liquid resin adapted to be hardened and polymerized by the application of heat, subjecting a portion of treated foundation to the action of heat to harden and polymerize the resin and produce a rigid structure of substantially the same configuration as the fibered foundation to form the body of the container while retaining the balance of the foundation in flexible condition and subsequently subjecting a portion of said balance to the action of heat to harden and polymerize the resin and provide a closure formed entirely by a portion of the coated foundation per se.

2. The method of manufacturing a container consisting in providing a flexible bag-like fabric closed at one end and having an open mouth, impregnating and coating both surfaces of said fabric with a liquid resin adapted to be hardened and polymerized by the application of heat, subjecting a substantial portion of said treated fabric to heat to so harden and polymerize it and produce a rigid structure forming the body of the container, folding the end of the treated fabric adjacent its mouth and subjecting said folded end to the action of heat to harden and polymerize said folded end and to hermetically seal the container while leaving that portion of the impregnated fabric intermediate the body of the container and its polymerized folded portion unhardened and flexible.

3. The method of manufacturing a container consisting in providing a flexible bag-like fabric closed at one end and having an open mouth, impregnating and coating both surfaces of said fabric with a liquid resin adapted to be hardened and polymerized by the application of heat, mounting a substantial portion of said impregnated fabric over the male member of a molding machine and in close engagement therewith while leaving the portion adjacent its mouth free bringing an interfitting female member of the molding machine over said male member and in close proximity with said substantial portion of the impregnated fabric, supplying heat to one of said molding machine members to thereby harden and polymerize the resin and produce a rigid body structure for the container having substantially the same configuration as the fabric and subsequently folding said free portion adjacent the mouth and subjecting it to heat to harden and polymerize it and provide a closure formed entirely by the coated fabric per se.

4. In an article of manufacture, a foundation of porous, fibered fabric comprising three integral portions to wit: a rigid body portion resistant to bending and folding and including the bottom of the container, a pliable and flexible intermediate portion and a rigid end portion constituting the closure for the container, a thin coating of hardened and polymerized liquid resin covering both surfaces of said body portion and end portion and a thin coating of unhardened liquid resin covering said flexible intermediate portion, the upper edge of said body portion providing a rigid guide for a cutting tool for cutting and separating the intermediate and end portions from the body portion.

5. In a container for holding and shipping commodities, a bag-like foundation of porous, fibered fabric comprising three integral portions to wit: a rigid body portion resistant to bending and folding and having a closed bottom, a pliable and flexible intermediate portion and a hermetically sealed end portion folded over on itself and providing a closure for the container, the upper edge of said rigid body portion providing a circumferential guide for a cutting tool for cutting and separating the intermediate and end portions from the body portion, a thin coating of hardened and polymerized liquid resin covering the body and end portions and entering and closing the interstices thereof and a thin coating of unhardened liquid resin covering the intermediate flexible portion and entering and closing the interstices thereof.

6. The method of manufacturing a container consisting in providing a porous, flexible, bag-like fabric foundation closed at one end and having an open mouth, impregnating and coating both surfaces of said foundation with a liquid resin adapted to be hardened by the application of heat whereby the pores of said foundation will be closed by said resin, subjecting a substantial portion of said coated foundation to heat to harden and polymerize the resin of said substantial portion and produce a rigid body portion of the container of substantially the same configuration as the original foundation and resistant to bending and folding and to provide a circumferential edge on said body portion acting as a guide for a cutting tool while leaving an end of the coated foundation in flexible condition, then subjecting a portion only of said flexible end to heat to harden and polymerize the resin and to provide a closure for the container formed entirely by the coated foundation while leaving that portion of the coated foundation adjacent the aforesaid circumferential edge and intermediate the body and closure in flexible condition.

7. The method of manufacturing a container consisting in providing a flexible bag-like fibered foundation closed at one end and having an open mouth, impregnating and coating both surfaces of said foundation throughout its length and including its closed end with a thin coating of liquid resin adapted to be hardened and polymerized by the action of heat, heating a substantial portion of the impregnated and coated foundation including its closed end to so harden and polymerize the resin and to provide a rigid body and end for the container resistant to bending and folding while leaving the balance of the coated foundation in flexible condition and subsequently heating and applying pressure to that portion of the coated foundation adjacent the open mouth to provide a closure for the container constituted entirely by a portion of the coated foundation per se.

8. The method of manufacturing a container consisting in providing a flexible bag-like fabric closed at one end and having an open mouth, impregnating and coating both surfaces of said fabric with a liquid resin adapted to be hardened and polymerized by the application of heat, mounting said impregenated fabric on the male member of a molding machine in such manner that a substantial portion thereof including the closed end is in close engagement with said male member while leaving that portion adjacent its mouth free, providing a female member for the molding machine, bringing said male and female members into operative relationship with each other with said female member in proximity to said substantial portion of the impregnated fabric, supplying heat to one of said members to harden and polymerize the resin on the aforesaid substantial portion to provide a rigid body for the container and subsequently closing and hermetically sealing the mouth of the impregnated fabric by applying heat and pressure to that portion of the impregnated fabric adjacent said mouth.

9. The method of manufacuring a container consisting in providing a flexible bag-like fabric closed at one end and having an open mouth, impregnating and coating both surfaces of said fabric with a liquid resin adapted to be hardened and polymerized by the application of heat, subjecting a substantial portion of said impregnated fabric to the heat-action of a molding machine having male and female members by mounting said impregnated fabric including its closed end on the male member and in close engagement therewith while leaving a portion thereof free and flexible and disengaged from said male member, bringing said male and female members into operative relationship, supplying heat to one of the members to harden and polymerize the resin on said substantial portion and to provide a rigid body for the container resistant to bending and folding and subsequently sealing the aforesaid open mouth by applying heat and pressure to the impregnated flexible fabric lying adjacent thereto.

JAMES D. GERAHTY.